United States Patent [19]

Sastra et al.

[11] Patent Number: 4,964,008
[45] Date of Patent: Oct. 16, 1990

[54] ROTATABLE MAGNETIC-HEAD UNIT FOR A MAGNETIC-TAPE APPARATUS

[75] Inventors: Budiman Sastra; Jacob G. Fijnvandraat; Leonardus H. M. Maaswinkel, all of Eindhoven; Everhardus A. Muijderman, Geldrop, all of Netherlands

[73] Assignee: U.S. Philips Corporation, New York, N.Y.

[21] Appl. No.: 304,397

[22] Filed: Jan. 30, 1989

[30] Foreign Application Priority Data

Jan. 29, 1988 [NL] Netherlands ............ 8800219

[51] Int. Cl.⁵ .................... G11B 15/60; G11B 5/52
[52] U.S. Cl. .................... 360/130.24; 360/107
[58] Field of Search ............ 360/107, 84, 129, 130.2, 360/130.21, 130.22, 130.23, 130.24, 130.3

[56] References Cited

U.S. PATENT DOCUMENTS

| | | | |
|---|---|---|---|
| 3,995,318 | 11/1976 | Serizawa | 360/130.24 |
| 4,040,109 | 8/1977 | Kryltsov | 360/84 X |
| 4,695,907 | 9/1987 | Inaji et al. | 360/107 |
| 4,701,821 | 10/1987 | Muller | 360/107 X |
| 4,774,606 | 9/1988 | Uhde | 360/107 X |
| 4,851,940 | 7/1989 | Saito | 360/84 |

FOREIGN PATENT DOCUMENTS 0028306  3/1977  Japan ............ 360/130.24

Primary Examiner—Robert S. Tupper
Assistant Examiner—Andrew L. Sniezek

[57] ABSTRACT

A rotatable magnetic-head unit comprises a cylindrical drum with at least one magnetic head for recording and/or reproducing signals on/from a magnetic tape. This magnetic tape is wrapped around a part of the circumference of the drum and is moved past that part of the drum circumference. In order to obtain a stable bearing arrangement for the magnetic-head unit the magnetic head is fixedly connected to the drum, whose wall is supported by means of spiral-groove bearings in the direct proximity of the magnetic heads in a stationary cylindrical housing. The drum can rotate inside the housing. The housing is formed with an opening in which the magnetic tape moves.

17 Claims, 2 Drawing Sheets

ROTATABLE MAGNETIC-HEAD UNIT FOR A MAGNETIC-TAPE APPARATUS

BACKGROUND OF THE INVENTION

The invention relates to a rotatable magnetic-head unit for recording and/or reproducing signals on/from a magnetic tape. The head unit comprises at least one magnetic head which is situated substantially within the circumference of a rotatable cylindrical drum and around which drum a magnetic tape is wrapped over a part of the drum circumference, which tape is moved past said part of the circumference. The drum is radially supported by at least one spiral-groove bearing. Such a head unit is disclosed in EP 0,180,852 A1, and is radially supported by spiral-groove bearings on the shaft, which also carries the drum. The heads of this unit can only perform a rotary movement.

A head unit in which the magnetic heads, in addition to a rotation, are also capable of performing a translation is known from DE-OS 25 35 780. In this known unit the heads are translated axially relative to the drum in openings which for this purpose are formed in the drum wall, the translation being controlled by means of a cam mechanism. The drum is supported by means of bearings on the drum shaft, which bearings are spaced from and arranged underneath the drum. Such a bearing arrangement on the drum shaft enables the head support to be translated relative to the drum.

In a rotatable head unit stringent requirements are imposed on the radial bearing means of the drum. In this respect it is of particular importance that the magnetic head is positioned accurately relative to the tape. Since the drum is supported at a specific radial and axial distance from the free end of the magnetic head, tolerances in the bearing means will give rise to positional deviations of the magnetic head in said known magnetic-head units. In the case of the translatable magnetic heads in the head unit in accordance with DE-OS 25 35 780 these tolerances are even more manifest on account of the multiple bearing arrangement. It is the object of the invention to ensure an accurate positioning of the magnetic head relative to the tape in such a magnetic-head unit which employs a stable spiral-groove bearing.

SUMMARY OF THE INVENTION

The invention is characterized in that the drum is wholly or partly surrounded by a cylindrical housing, the groove pattern of the spiral-groove bearing is formed in one of the facing walls of the drum and the housing, and the housing has an opening through which the magnetic tape is guided as it moves past said part of the drum circumference. This results in a construction in which the drum is supported circumferentially, so that in operation the radial distance between the bearing means and the path of rotation of the free end of the magnetic head is minimized.

A preferred embodiment of the head unit in accordance with the invention is characterized in that the spiral-groove bearing is provided in the inner wall of the housing. This results in a minimal axial distance between the bearing means and the path of rotation of the free end of the magnetic head.

Combining the two above characteristic features yields a construction in which the spiral-groove bearing is situated in the direct proximity of the opening in the cylindrical housing, so that in operation the distance between the bearing means and the path of rotation of the free end of the magnetic head is minimal. This results in a minimal positioning error of the head relative to the tape in the event of bearing tolerances.

Another preferred embodiment of the head unit is characterized in that the cylindrical housing is mounted stationarily. This is in order to avoid an unnecessarily intricate construction.

A further preferred embodiment of the head unit is characterized in that resilient means are arranged on the housing near the opening to urge the tape, as it passes through the opening, with its tape edge against the tape-guide face of the opening. In this way the position of the tape relative to the rotating and translating drum is always defined exactly, which is essential for the correct operation of the apparatus.

A further preferred embodiment of the head unit is characterized in that the tape-guide face of the opening is inclined relative to a plane perpendicular to the axis of rotation of the drum. This enables the signal tracks to be written obliquely on the tape or to be read obliquely from the tape.

Another preferred embodiment of the head unit is characterized in that the tape-guide face of the opening extends parallel to a plane perpendicular to the axis of rotation of the drum. This embodiment enables signal tracks to be written or read in a longitudinal direction of the tape.

A further preferred embodiment of the head unit is characterized in that the drum carrying the heads is arranged to be rotatable and translatable and is coupled to drive means to perform said two movements. Thus, the signal tracks can be written or read above or underneath one another, which is of particular importance for tracks which extend in the longitudinal direction of the tape in order to achieve a high signal density on the tape. By a suitable combination of rotation and translation a herring-bone pattern can be written on the tape. Another advantage of the drum being axially translatable is that the heads translate with, instead of relative to, the drum.

Yet another advantage of said translation possibility is that the translational movement is unconstrained and is not dictated by a fixed pattern in time, for example by means of a cam mechanism or by means of a guideway. This enables different read and write methods for the magnetic tape to be realized without the construction of the head unit being modified.

BRIEF DESCRIPTION OF THE DRAWINGS

Embodiments of a rotatable magnetic head unit will now be described in more detail, by way of example, with reference to the accompanying drawings, which also show examples of signal tracks as written on and/or read from the magnetic tape. In the drawings.

DETAILED DESCRIPTION OF PREFERRED EMBODIMENTS

Figure 1:
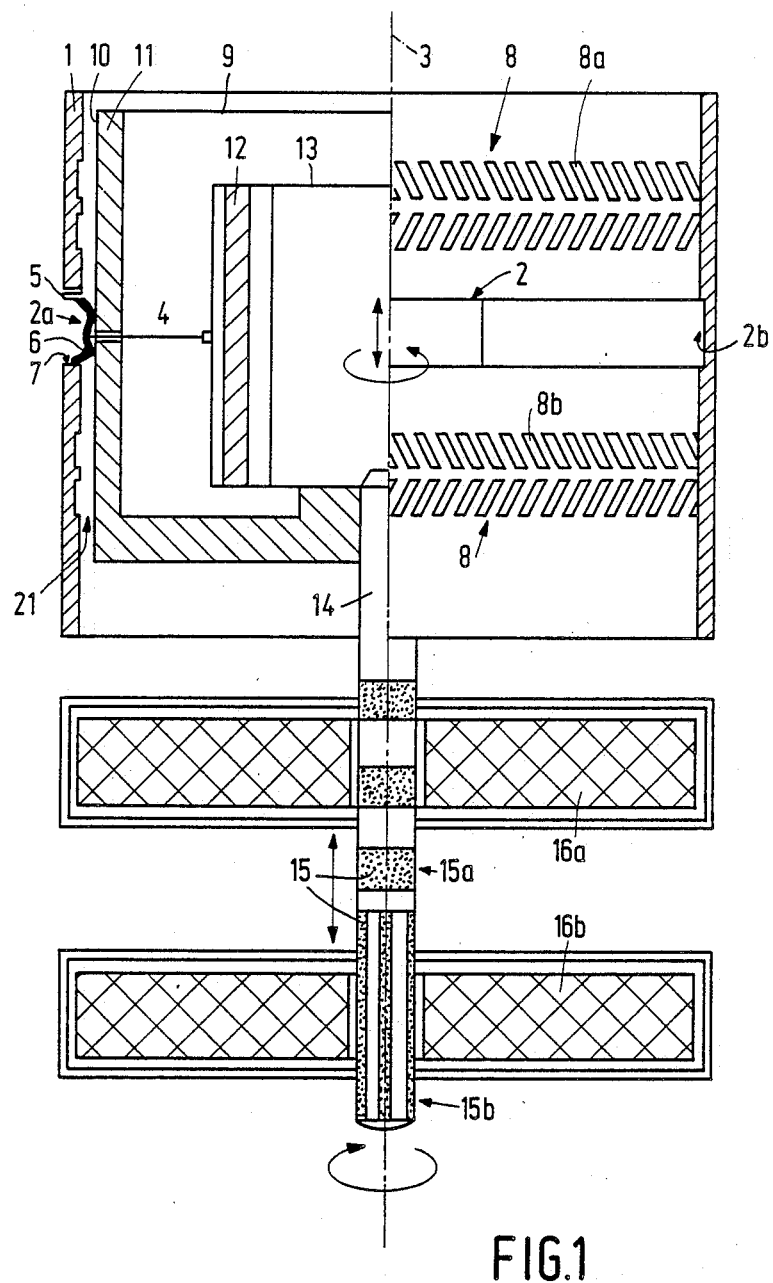
FIG. 1 is a vertical sectional view of a rotatable magnetic-head unit in accordance with the invention, the tape-guide face of the opening extending parallel to a plane perpendicular to the axis of rotation of the drum.

The rotatable magnetic-head unit shown in FIG. 1 comprises a stationary cylindrical housing 1 mounted on a frame, not shown, which housing is formed with an opening 2 over its entire circumference. Over a part of the circumference 2a this opening 2 extends through the entire thickness of the cylinder wall. Over the remainder of the circumference 2b the opening 2 takes the form of a recess in the inner side of the cylinder wall. The height of the opening 2 is equal to the width of a magnetic tape 6 guided in the opening plus the height of a blade-shaped resilient means 5.

The magnetic tape 6 moves in the part 2a of the opening where the cylinder wall has been removed over its entire thickness. The blade-shaped resilient means 5 are secured to the housing 1 at the top of the opening 2 and press against the upper edge of the magnetic tape 6. As a result of this, the lower edge of the magnetic tape 6 is in contact with a tape-guide face 7 which bounds the lower side of the opening 2. This tape-guide face 7 extends parallel to a plane perpendicular to the axis of rotation 3 of a cylindrical drum 9, which is concentric with the housing 1.

This drum 9 is supported in the housing 1 by means of two dynamic spiral-groove bearings 8. The groove patterns 8a and 8b are formed in the inner side of the cylinder wall of the housing 1 in the direct proximity of the opening 2.

Two magnetic heads 4 are arranged inside the drum 9 in the middle of the drum wall 11 and are disposed in the drum wall 11 at the same level and 180° spaced from one another. The heads 4 are arranged in the drum wall 11 in such a way that the recording/scanning faces at their free ends are situated on a circle which is concentric with said drum wall and which has a diameter larger than or equal to the diameter of the outer wall of the drum 9, the other head portions being situated inside this circle. In this way the head faces of the heads 4 can make contact with the magnetic tape 6, which is pressed against the rotary drum 9 as a result of the movement through the opening 2.

At its underside the drum 9 is connected to a shaft 14 which extends vertically downwards and which is provided with magnet poles 15. The upper magnet poles 15 each comprise a ring 15a which is concentric with said shaft and are formed below one another in the outer wall of the shaft 14. The lower magnet poles 15 each comprise a rectangle 15b and are formed adjacent one another in the outer wall of the shaft 14 in such a way that the longitudinal axis of the rectangle extends parallel to the axis of rotation 3. The horizontally disposed magnet poles 15a cooperate with a coil 16a which is fixedly mounted on a frame, not shown, and they provide the vertical translation of the drum 9 and the magnetic heads 4 arranged in this drum via the shaft 14. The vertical magnet poles 15b cooperate with a coil 16b which is fixedly mounted on the frame, not shown, and provide the rotation of the drum 9 and the magnetic heads 4 via the shaft 14.

The signal is transferred from the rotary magnetic heads 4 to the stationary parts on the frame via transformer rings 12. These transformer rings 12 are arranged in a cylinder 13, which is rigidly connected to the frame, not shown.

Figure 2:
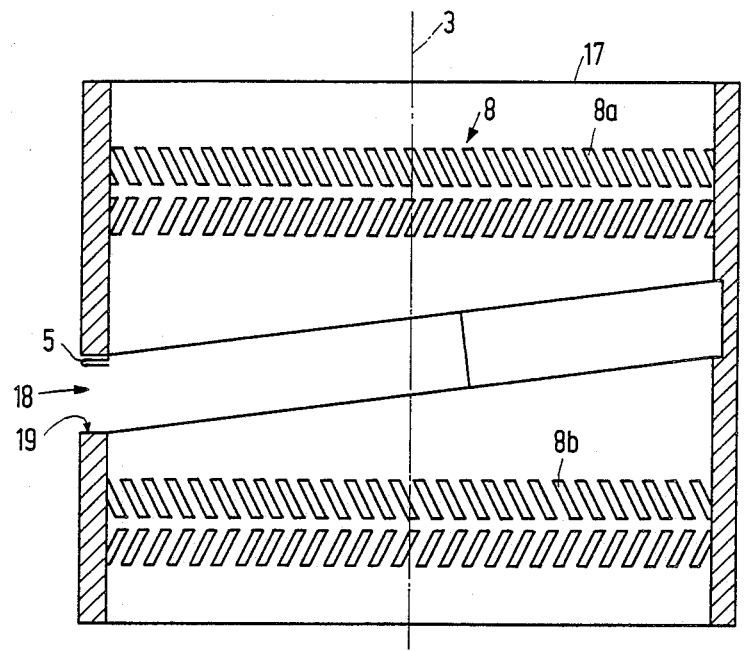
FIG. 2 is a vertical sectional view of a rotatable magnetic-head unit in accordance with another embodiment of the invention, in which the tape-guide face of the opening is inclined relative to a plane perpendicular to the axis of rotation of the drum.

FIG. 2 shows another example of a cylindrical housing 17. In this embodiment an opening 18 is formed in the cylinder wall of the housing 17 in such a way that the tape-guide face 19 is inclined relative to a plane perpendicular to the axis of rotation 3 of the drum 9, the drum and other parts not being shown in FIG. 2.

Figure 3:
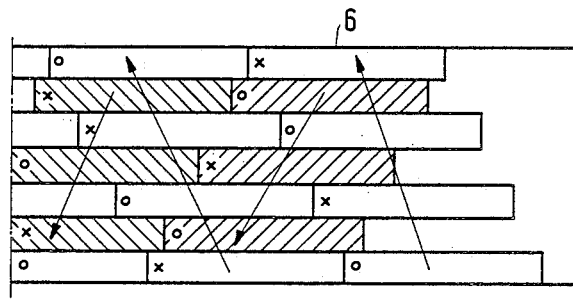
FIG. 3 shows the pattern with which the signals are written on or read from the tape in a longitudinal direction in the case of the embodiment of the magnetic-head unit shown in FIG. 1.
Figure 4:
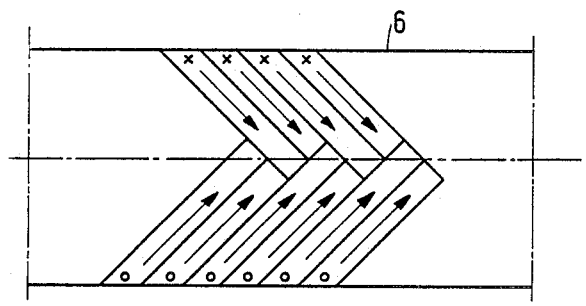
FIG. 4 shows the herring-bone pattern with which the signals are written on and/or read from the tape in the case of the embodiment of the magnetic-head unit shown in FIG. 1.

FIGS. 3 and 4 show the patterns of the signal tracks. The rectangles marked "O" are tracks corresponding to one magnetic head and the rectangles marked "X" are tracks corresponding to the other magnetic head. FIG. 3 shows the pattern obtained with the embodiment of the magnetic-head unit shown in FIG. 1, in which the tape-guide face of the opening 2 in the housing 1 extends parallel to a plane perpendicular to the axis of rotation 3 of the drum 9. The read and write sequence is from the right to the left in FIG. 3 and alternately from the bottom to the top and from the top to the bottom, the magnetic tape 6 being moved to the right. Between two consecutive tracks a spacing is formed equal to the width of one track. This spacing accommodates the track which is written if the head is translated in the opposite vertical direction. Writing or reading is effected alternately by one head and by the other head.

FIG. 4 shows the herring-bone pattern obtained in the case of the embodiment of the magnetic-head unit shown in FIG. 1. The herring-bone pattern is obtained by a suitably combined rotation and translation of the drum 9. Again the write sequence is from the right to the left. One head now writes the tracks from the upper edge towards the middle of the tape 6 and the other head writes tracks from the lower edge towards the middle of the tape 6. Writing or reading is effected alternately by one head or the other. Again the magnetic tape 6 moves to the right.

In the embodiment of the magnetic-head unit shown in FIG. 2, in which the tape-guide face of the opening 18 in the housing 17 is inclined relative to a plane perpendicular to the axis of rotation 3 of the drum 9, the customary helical-scan pattern is recorded on the magnetic tape 6. The drum 9 then only performs a rotary movement, the axial movement being inhibited.

The embodiment of the magnetic-head unit in accordance with the invention described in the foregoing can also be provided with the groove pattern of the spiral-groove bearing in the outer wall of the rotary drum. However, this groove pattern should then be situated at a suitable distance from the magnetic heads in order to prevent the grooves from reaching the opening during translation of the drum, which would impair a stable bearing action. It is alternatively possible to provide the magnetic-head unit with only one spiral-groove bearing. However, this provides a less stable bearing action.

Instead of two heads the magnetic-head unit may comprise one head or more than two heads. A correct operation of the magnetic-head unit is also possible without the drum being translated. However, in the embodiment shown in FIG. 1 this will result in the signal density on the tape being reduced. It is also possible for the housing to be rotated but with a lower speed than that of the drum. One possibility is to rotate the housing in such a way that the circumferential speed of the housing is equal to the speed of the tape, which will eliminate friction and wear at the location of the tape-housing contact.

We claim:

1. A magnetic-head unit for a magnetic tape, comprising a cylindrical drum rotatable about an axis adapted to receive a magnetic tape wrapped over and moved past a part of the drum circumference, at least one magnetic head disposed substantially within the drum a cylindrical housing at least partly surrounding the drum and separated from the drum by a gap formed between opposed facing walls of the drum and housing, a spiral-groove bearing formed in one of the facing walls of the drum and the housing, and an opening in the housing through which the magnetic tape is guided as it moves past said part of the circumference of the drum.

2. A magnetic-head unit as claimed in claim 1, in which the spiral-groove bearing is formed in the inner walls of the housing.

3. A magnetic-head unit as claimed in claim 2, in which the cylindrical housing is fixedly mounted.

4. A magnetic-head unit as claimed in claim 3, in which the opening comprises a tape guide face and further comprising resilient means on the housing near the opening to urge the tape, against the tape-guide face of the opening.

5. A magnetic-head unit as claimed in claim 4, in which the tape-guide face of the opening is inclined relative to a plane perpendicular to the axis of rotation of the drum.

6. A magnetic-head unit as claimed in claim 4, in which the tape-guide face of the opening is parallel to a plane perpendicular to the axis of rotation of the drum.

7. A magnetic-head unit as claimed in claim 6, comprising drive means for rotating and translating the drum relative to the tape.

8. A magnetic-head unit as claimed in claim 1, in which the cylindrical housing is fixedly mounted.

9. A magnetic-head unit as claimed in claim 2, in which the opening comprises a tape guide face and further comprising resilient means on the housing near the opening to urge the tape, against the tape-guide face of the opening.

10. A magnetic-head unit as claimed in claim 1, in which the opening comprises a tape guide face and further comprising resilient means on the housing near the opening to urge the tape, against the tape-guide face of the opening.

11. A magnetic-head unit as claimed in claim 10, in which the tape-guide face of the opening is inclined relative to a plane perpendicular to the axis of rotation of the drum.

12. A magnetic-head unit as claimed in claim 9, in which the tape-guide face of the opening is inclined relative to a plane perpendicular to the axis of rotation of the drum.

13. A magnetic-head unit as claimed in claim 8, in which the opening includes a tape guide face inclined relative to a plane perpendicular to the axis of rotation of the drum.

14. A magnetic-head unit as claimed in claim 1, comprising drive means for rotating and translating the drum relative to the tape.

15. A magnetic-head unit as claimed in claim 2, comprising drive means for rotating and translating the drum relative to the tape.

16. A magnetic-head unit as claimed in claim 3, comprising drive means for rotating and translating the drum relative to the tape.

17. A magnetic-head unit as claimed in claim 4, comprising drive means for rotating and translating the drum relative to the tape.

* * * * *